(12) United States Patent
Tanaka et al.

(10) Patent No.: US 6,509,767 B2
(45) Date of Patent: Jan. 21, 2003

(54) WAKE-UP CIRCUIT

(75) Inventors: Masaaki Tanaka, Miyagi-ken (JP); Hideki Tamura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/956,542

(22) Filed: Sep. 19, 2001

(65) Prior Publication Data

US 2002/0036520 A1 Mar. 28, 2002

(30) Foreign Application Priority Data

Sep. 26, 2000 (JP) ........................................ 2000-297080

(51) Int. Cl.$^7$ ................................................. H03L 7/00

(52) U.S. Cl. ........................................ 327/142; 327/198

(58) Field of Search ................................ 327/142, 143, 327/198

(56) References Cited

FOREIGN PATENT DOCUMENTS

JP 7-44211 2/1995

*Primary Examiner*—Kenneth B. Wells
(74) *Attorney, Agent, or Firm*—Brinks Hofer Gilson & Lione

(57) ABSTRACT

A wake-up contains a controller provided with an analog voltage input terminal, a trigger signal input terminal, and first and second output terminals and enabled to control an external device according to a voltage value entered to the analog voltage input terminal and output a high level voltage via the first output terminal in a sleep state and output a low level voltage via the second output terminal upon applying of a voltage to the trigger signal input terminal, thereby it is woken up; resistance value changing means provided with a plurality of switches and a plurality of resistors; pull-up means; and wake-up trigger signal generating means. The wake-up trigger signal generating means outputs a trigger signal when the voltage of the resistance value changing means changes.

9 Claims, 3 Drawing Sheets

WAKE-UP CIRCUIT

BACKGROUND OF THE INVENTION

1. Field of the Invention

The present invention relates to a wake-up circuit, more particularly to a wake-up circuit preferred for such external switch input circuits as power-driven window switches, door modules, power-driven seat modules, etc. installed on vehicles.

2. Description of the Prior Art

Each of the external switch input circuits such as power-driven window switches, power-driven mirror switches, door modules, power-driven seat modules, etc. installed on vehicles is required to work even after the ignition key is turned off. This is why power is kept supplied to the external switch input circuit. When this circuit is kept set in a state ready to work any time, however, the power consumption increases over the capacity of the on-vehicle battery, thereby the engine of the vehicle often cannot be started.

In order to prevent such a problem, there have been proposed various types of wake-up circuits, each of which drives the subject vehicle into a low power consumption mode (sleep mode) automatically in a predetermined time after the ignition switch is turned off, thereby suppressing the power consumption, and when any one of the switches of the wake-up circuit is operated, the normal operation (wake-up) mode is restored.

Each of such the conventional wake-up circuits, as shown in the circuit diagram in FIG. 3, is configured by a controller (hereinafter, to be described as "CPU") 31; a switch unit 32; pull-up means 33; and wake-up trigger signal generating means 34.

The CPU 31 is provided with a plurality of input terminals (IN1, IN2, and IN3) and a trigger signal input terminal (INT) used to receive a voltage for waking up itself from the sleep state. When a voltage entered to one of the input terminals (IN1 to IN3) drops, the CPU 31 outputs a plurality of control signals for controlling the external device (not shown). The CPU 31 goes into a predetermined state, for example, into the sleep mode, a few minutes after the ignition key is turned off. The CPU 31 is woken up by a voltage applied to the trigger signal input terminal (INT).

The switch unit 32 is provided with a plurality of switches (32a, 32b, and 32c), each of which is grounded at its one end. The other end of each of those switches (32a, 32b, and 32c) is connected to its corresponding input terminal (IN1/IN2/IN3) of the CPU 31 via a resistor (R35/R36/R37)

The pull-up means 33 connects a power supply terminal 35 to the other end of each of the switches (32a to 32c) of the switch unit 32 via pull-up resistors (R31/R32/R33) respectively so as to pull up the other end of each of the switches (32a to 32c).

The wake-up trigger signal generating means 34 is configured by a PNP switch transistor TR1 and an OR circuit (ground: 1, not ground: 0) consisting of diodes (D31, D32, and D33). The base of the transistor TR1 is connected to the anode side of the OR circuit and the emitter of the TR1 is connected to a power supply terminal 36, and the collector of the TR1 is connected to the trigger signal input terminal (INT) of the CPU 31. The cathode of the OR circuit (consisting of diodes D31, D32, and D33) is connected to the other end of each of the switches (32a to 32c) of the switch unit 32.

Because the conventional wake-up circuit is configured as described above, when any one of the switches (32a to 32c) of the switch unit 32 is operated, the switch (32a to 32c) is grounded at its one end. The voltage applied to the corresponding input terminal (IN1 to IN3) corresponding to the operated switch (32a to 32c) of the CPU 31 goes into the low level. On the other hand, the CPU 31 monitors the voltage at this input terminal (IN1 to IN3) and decides the operated switch (32a to 32c) and outputs a control signal via the output terminal (not shown) in accordance with the operated switch (32a to 32c) so as to control the subject external device installed in a vehicle.

In the case where any one of the switches (32a to 32c) of the switch unit 32 is operated while the CPU 31 is in a predetermined state, for example, in the sleep mode to be set a few minutes after the ignition key is turned off, one end of the switch (32a to 32c) is grounded. As a result, the anode side of the OR circuit composed of the diodes (D31 to D33) also takes the ground voltage, thereby the transistor TR1 is turned on. The power supply 36 thus applies a voltage to the trigger signal input terminal (INT) of the CPU 31 and the terminal (INT) is driven into the high level. At this high level of the voltage entered to the terminal (INT), the CPU 31 is restored to the normal mode and outputs control signals for controlling the subject external device installed on a vehicle, in accordance with the operated switch (32a to 32c).

Because of the configuration and the operation as described above, the CPU 31 controls the target device in accordance with the operated switch (32a to 32c) When no operation is required, the CPU 31 goes into the sleep mode so as to suppress the power consumption. When any one of the switches (32a to 32c) is operated in the sleep mode, the CPU 31 is woken up.

However, such a wake-up circuit, in which the switches (32a to 32c) of the switch unit 32 are disposed in parallel with respect to the CPU 31, is required so as to provide the same number of connection lines and the same number of input terminals (IN1 to IN3) of the CPU 31 as the number of switches (32a, 32b, and 32c) respectively. In addition, connection lines are also needed for the diodes (D31 to D33) so as to connect the wake-up trigger signal generating means 34. Consequently, the conventional wake-up circuit requires many parts and many connection lines, so that the circuit is complicated in structure.

Furthermore, because the configuration of the start-up circuit is decided by the number of switches (32a to 32c) of the switch unit 32, the wake-up circuit is not compatible with other circuits when the number of switches of the switch unit 32 differs among them. This has been an obstacle for reducing the manufacturing cost of the start-up circuit.

Furthermore, it has been difficult to increase the number of switches in the switch unit 32 without modification of the circuit configuration; for example, when another switch 32d is to be added to the switch unit 32, another connection line, another input terminal IN4, another diode D34, etc. denoted by broken lines in FIG. 3 are needed for the CPU 31. Once the start-up circuit is designed, therefore, it is very difficult to expand the circuit.

SUMMARY OF THE INVENTION

Under such circumstances, it is an object of the present invention to solve the above conventional problems and provide a wake-up circuit to be simplified in configuration, to require less parts and less connection lines, and to be configured regardless of the number of switches, thereby to be easy to increase the number of switches later.

In order to solve the above conventional problems, the wake-up circuit of the present invention comprises a controller provided with an analog voltage input terminal and a trigger signal input terminal so as to output a plurality of control signals corresponding to a value of an analog voltage entered to the analog voltage input terminal; and resistance value changing means provided with a plurality of switches and a plurality of resistors, one end of which is grounded and the other end of which is connected to the analog voltage input terminal as well as to a power source by pull-up means provided with at least a pull-up resistor, so as to change, by the switches, the resistance value between the one end and the other end, wherein a wake-up trigger signal generating means is provided between the resistance value changing means and the trigger signal input terminal, thereby the wake-up trigger signal generating means outputs a trigger signal when the voltage of the resistance value changing means changes, thereby waking up the controller.

Because the wake-up circuit is configured as described above, just one connection line is required both for the connection between the resistance value changing means and the analog voltage input terminal of the controller and for the connection between the resistance value changing means and the wake-up trigger signal generating means. The configuration of the wake-up circuit is thus simplified with use of less parts and less connection lines. In addition, because the configuration of wake-up circuit is not decided by the number of switches in the resistance value changing means, the wake-up circuit is compatible with other circuits even when the number of the switches differ among them. Therefore, the manufacturing cost of the wake-up circuit can be reduced. And, the number of switches in the resistance value changing means can be increased easily as needed.

Furthermore, in the wake-up circuit, the controller is provided with a first output terminal for outputting a high level voltage in a sleep state and a low level voltage upon receiving of the trigger signal, and the wake-up trigger signal generating means is composed of a PNP transistor at which an emitter is connected to the first output terminal, a collector is connected to the trigger signal input terminal, and a base is connected to the other end of the resistance value changing means respectively.

Because the wake-up circuit of the present invention is configured as described above, the wake-up trigger signal generating means can be composed simply of a transistor and generation of another trigger signal can be suppressed immediately when a trigger signal is detected. The power consumption of the wake-up circuit can thus be reduced.

Furthermore, the present invention has enabled the wake-up trigger signal generating means to be configured by a PNP transistor at which an emitter is connected to a power supply that outputs a high level voltage and a collector is connected to the trigger signal input terminal; and a differentiating circuit provided between the base of the PNP transistor and the other end of the resistance value changing means respectively.

Because the wake-up circuit of the present invention is configured as described above, the wake-up trigger signal generating means can be composed simply of a transistor and a differentiating circuit, and the differentiating circuit enables the trigger signal to take a low level voltage automatically. The power consumption of the wake-up circuit can thus be reduced more than ever.

Furthermore, the wake-up circuit of the present invention is configured so as to provide the pull-up means with switching means connected serially to the pull-up resistor and the controller with a second output terminal, thereby a signal output from the second output terminal turns off the switching means when the controller is in a sleep state and turns on the switching means when the controller is woken up.

Because the wake-up circuit is configured as described above, the power supply to the controller from the pull-up means is shut off in the sleep mode, so that no waste power is supplied to the controller, thereby the power consumption of the wake-up circuit can be reduced more than ever.

Furthermore, in the wake-up circuit of the present invention, the switching means is composed of a transistor at which a base is connected to the second output terminal.

Because the switching means is composed of a transistor such a way, the configuration of the switching means can be simplified.

DESCRIPTION OF THE PREFERRED EMBODIMENTS

Hereunder, the wake-up circuit of the present invention in the first embodiment will be described with reference to FIG. 1.

Figure 1:
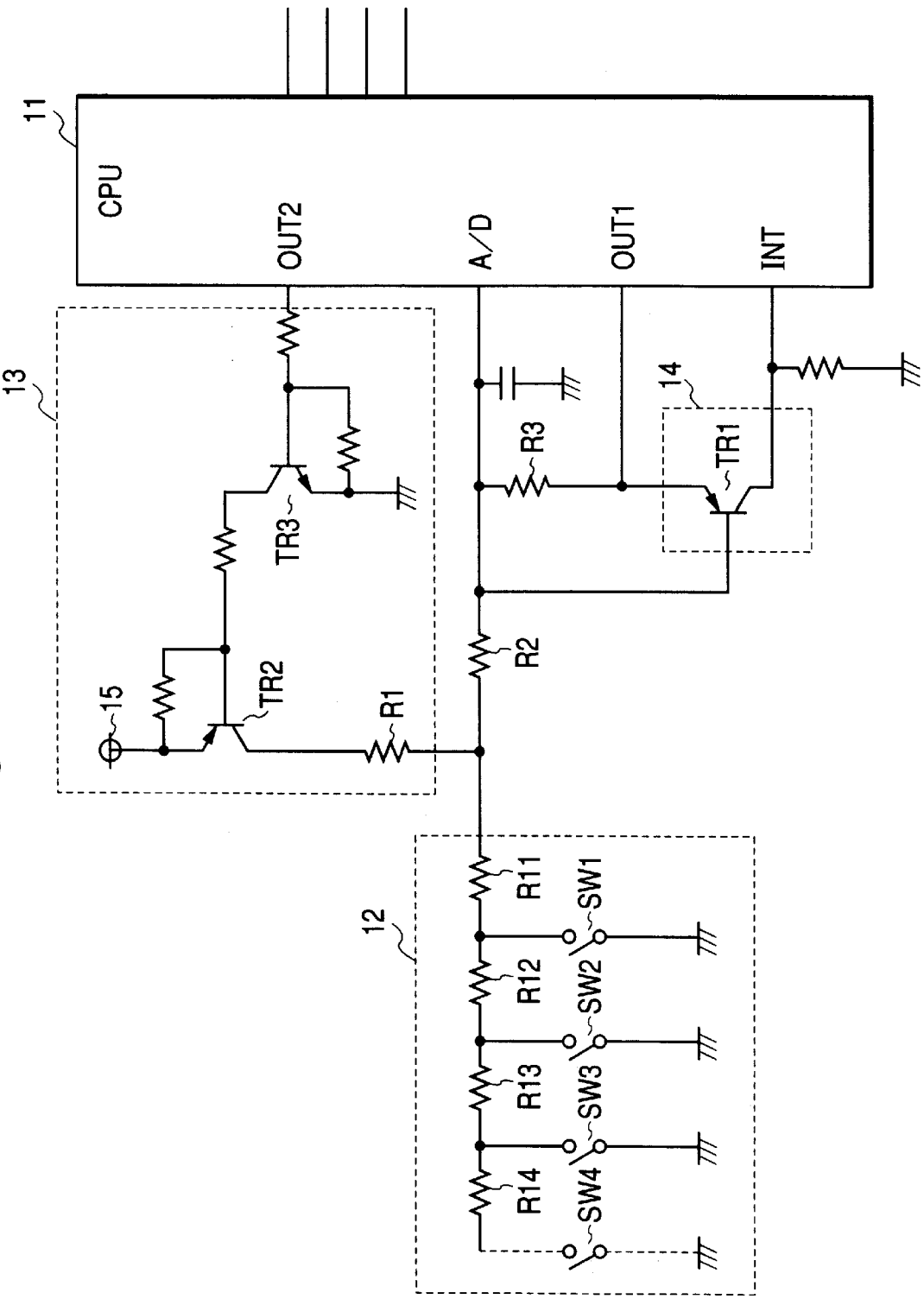
FIG. 1 is a circuit diagram of a wake-up circuit in the first embodiment of the present invention.

FIG. 1 shows a configuration of the wake-up circuit of the present invention in the first embodiment.

The wake-up circuit of the present invention is composed of a controller (hereinafter, to be described as "CPU") 11; resistance value changing means (hereinafter, to be described as the "switch unit") 12; pull-up means 13; and wake-up trigger signal generating means 14.

The CPU 11 is provided with an analog voltage input terminal (A/D) which receives an analog voltage; a trigger signal input terminal (INT) which receives a trigger signal used to wake itself up from the sleep state; a first output terminal (OUT1) and a second output terminal (OUT2) used to output a high level voltage signal (ex., +5V) and a low level voltage signal (ex., 0V) respectively. The CPU 11 outputs a plurality of control signals used to control an external device (not shown) according to a value of an analog voltage entered to the analog voltage input terminal (A/D). The CPU 11 goes into a predetermined state, for example, the sleep mode, a few minutes after the ignition switch is turned off and outputs a high level voltage signal via the first output terminal (OUT 1) and a low level voltage signal via the second output terminal (OUT 2) in the sleep mode respectively. When a voltage is applied to the trigger signal input terminal (INT), the CPU 11 is restored to the normal mode (woken up) and outputs a low level voltage signal via the first output terminal (OUT1) and a high level voltage signal via the second output terminal (OUT2). The first output terminal (OUT1) of the CPU 11 is connected to the analog voltage input terminal (A/D) via a resistor R3.

The switch unit 12 is composed of a plurality of switches (SW1, SW2, and SW3) and a plurality of resistors (R11, R12, and R13). One end of the resistor R1 is connected to one end of the resistor R12 and the other end of the resistor R12 is connected to one end of the resistor R13. And, the switch SW1 is connected between a junction located between the resistors R11 and R12, and a ground. The switch SW2 is connected to between a junction located between the resistors R12 and R13, and a ground. The SW3 is connected between the other end of the resistor R13 and a ground. Because of this configuration of the switch unit 12, the resistance value between the ground and the other end of the resistor R11 is changed by an operated switch (SW1, SW2, or SW3). The other end of the resistor R11 is connected to the analog voltage input terminal (A/D) of the CPU 11 via the resistor R2.

The pull-up means 13 is composed of a PNP transistor TR2 and an NPN transistor TR3. The collector of the transistor TR2 is connected to the other end of the resistor R11 via the pull-up resistor R1 and the emitter thereof is connected to a power supply terminal 15 of the subject vehicle and the base thereof is connected to the collector of the transistor TR3. The emitter of the transistor TR3 is grounded and the base there of is connected to the second output terminal (OUT2) of the CPU 11.

The wake-up trigger signal generating means 14 is composed of a PNP switching transistor TR1. One end of the base of the transistor TR1 is connected to the other end of the resistor R2, which is connected to the other end of the resistor R11. The collector thereof is connected to the trigger signal input terminal (INT) of the CPU 11 and the emitter thereof is connected to the first output terminal (OUT1) of the CPU 11. And, when the voltage at the other end of the resistor R11 of the switch unit 12 drops, the transistor TR1 is turned on, thereby a voltage is output from the first output terminal (OUT1) of the CPU 11 to the trigger signal input terminal (INT) of the CPU 11 as a wake-up signal.

Because the wake-up circuit is configured as described above, while the CPU 11 is woken up, the CPU 11 outputs a high level voltage via the second output terminal (OUT2). Both the TR2 and TR3 of the pull-up means 13 are thus turned on and a pulled-up voltage is applied to the other end of the resistor R11. When any one of the switches (SW1 to SW3) of the switch unit 12 is operated at this time, one end of the operated switch (SW1 to SW3) is grounded, thereby a pulled-up voltage at the other end of the resistor R11 drops. This voltage is then divided by the resistors R2 and R3 and entered to the analog voltage input terminal (A/D) of the CPU 11. According to this voltage value, the CPU 11 decides which switch (SW1 to SW3) is operated and outputs control signals to the subject external device installed on the subject vehicle (not shown)via an output terminal (not shown) in accordance with the operated switch (SW1 to SW3) so as to control the device.

When the CPU 11 is in a predetermined state, for example, in the sleep mode to be set a few minutes after the ignition key is turned off, the CPU 11 outputs a low level voltage via the second output terminal (OUT2). Both the TR2 and TR3 of the pull-up means are thus turned off, thereby no voltage is applied to the other end of the resistor R11 from the power supply terminal 15 of the subject vehicle and a voltage is applied to the other end of the resistor R11 from the first output terminal (OUT1) When any one of the switches (SW1 to SW3) of the switch unit 12 is operated at this time, the other end of the operated switch (SW1 to SW3) is grounded, thereby the voltage pulled up at the other end of the resistor R11 drops and the transistor TR1 is turned on. As a result, a high level voltage is entered to the trigger signal input terminal (INT) of the CPU 11. When such a high level voltage is entered to the trigger signal input terminal (INT), the CPU 11 is restored to the normal mode (woken up) and outputs a high level voltage via the second output terminal (OUT2) so as to turn on both the TR2 and TR3 of the pull-up means 13 and apply a pulled-up voltage to the other end of the resistor R11 and control the subject device in accordance with the operated switch (SW1 to SW3) The CPU 11 thus outputs a low level voltage via the first output terminal (OUT1). And, the trigger signal level becomes low.

Because of the configuration and operation as described above, the CPU 11 in this wake-up circuit decides which switch (SW1 to SW3) is operated and controls the subject device in accordance with the operated switch (SW1 to SW3). When no operation is required, the CPU 11 goes into the sleep mode so as to suppress the power consumption. When one of the switches (SW1 to SW3) is operated in the sleep mode, the CPU 11 is woken up.

In this wake-up circuit of the present invention, only one connection is required both for the connection between the switch unit 12 and the analog voltage input terminal (A/D) of the CPU 11 and for the connection between the switch unit 12 and the wake-up trigger signal generating means 14 respectively. The configuration of the wake-up circuit is thus simplified with use of less parts and less connection lines.

Furthermore, because the configuration of the wake-up circuit is not decided by the number of switches in the switch unit 12, the wake-up circuit is compatible with other circuits even when the number of switches differs among them. The manufacturing cost of the wake-up circuit can thus be reduced more than ever.

Furthermore, the switch unit 12 can be provided with another switch SW4 easily just by adding a connection line and a resistor R14 denoted by broken lines in FIG. 1 after the wake-up circuit is designed. The circuit can thus be expanded easily.

And, because the power supply from the pull-up means 13 is shut off in the sleep mode, no waste power is supplied to the wake-up circuit. The power consumption of the wake-up circuit is thus reduced more than ever.

Figure 2:
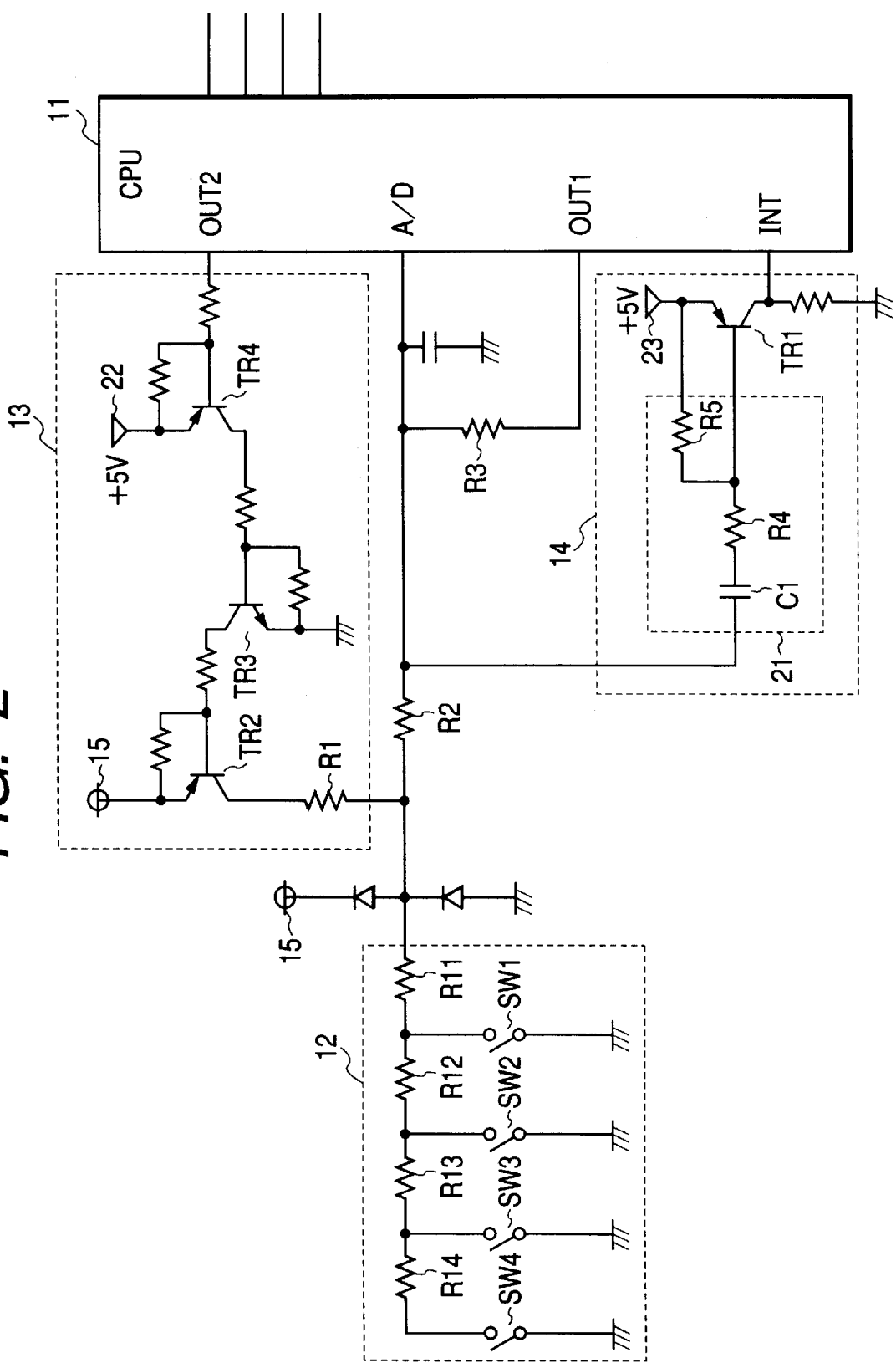
FIG. 2 is a circuit diagram of a wake-up circuit in the second embodiment of the present invention.
Figure 3:
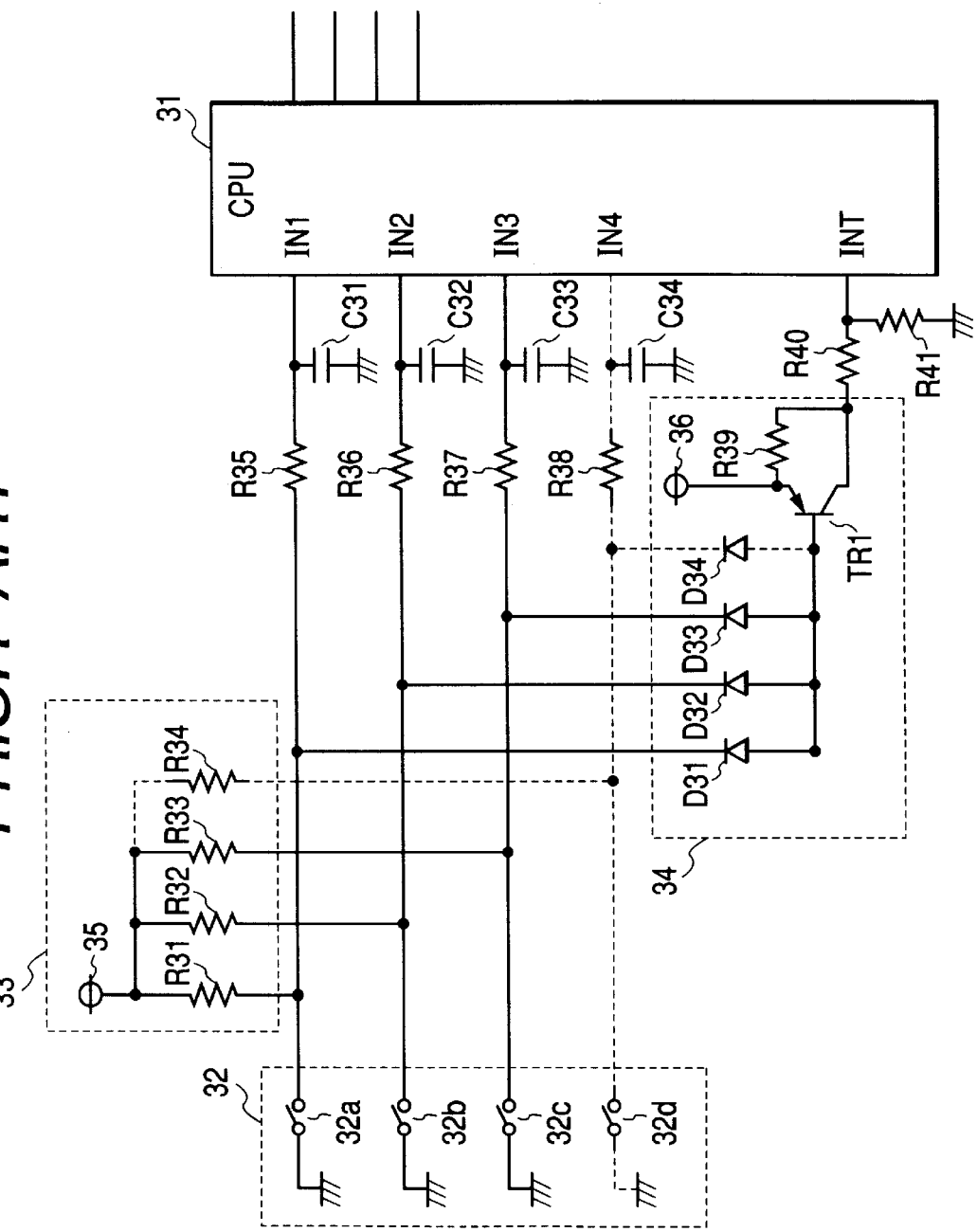
FIG. 3 is a circuit diagram of a conventional wake-up circuit.

Next, a description will be made for the wake-up circuit in the second embodiment of the present invention with reference to FIG. 2. In FIG. 2, the same reference numerals are used for the same components as those shown in FIG. 1 for the first embodiment, avoiding a redundant description.

In this second embodiment, the second output terminal (OUT2) of the CPU 11 outputs a high level voltage in the sleep mode. When the CPU 11 is woken up, the output terminal (OUT2) outputs a low level voltage.

The base of the transistor TR3 of the pull-up means 13 is connected to the collector of the PNP transistor TR4, the emitter thereof is connected to the power supply terminal 22, and the base thereof is connected to the second output terminal (OUT2) of the CPU 11 respectively.

Furthermore, the wake-up trigger signal generating means 14 is composed of a transistor TR1 and a differentiating circuit 21 composed of a capacitor C1 and resistors R4 and R5. The emitter of the transistor TR1 is connected to the power supply terminal 23, the collector thereof is connected to the trigger signal input terminal (INT) of the CPU 11, and the base thereof is connected to the other end of the resistor R2 via the capacitor C1.

Because of the configuration as described above, when the CPU 11 wakes up, the operation of the CPU 11 is the same as that in the first embodiment in accordance with the operation of any one of the switches (SW1 to SW3) of the switch unit 12. The description for the operation will thus be omitted here.

When any one of the switches (SW1 to SW3) of the switch unit 12 is operated while the CPU 11 is in the sleep mode, one end of the operated switch (SW1 to SW3) is grounded. The voltage pulled up at the other end of the resistor R11 thus drops, thereby the charge accumulated in the capacitor C1 is discharged to the switch unit 12. When the capacitor C1 is discharged completely, the transistor TR1 is turned on and a high level voltage is entered to the trigger signal input terminal (INT) of the CPU 11. The CPU 11 is then restored to the normal mode (woken up) and controls the subject device in accordance with the operated switch (SW1 to SW3). On the other hand, the capacitor C1 is charged by the base current from the transistor TR1 and the base current stops when the capacitor C1 is charged enough. The transistor TR1 is thus turned off and the trigger signal level becomes low.

As described above, according to the present invention, the wake-up circuit comprises a controller provided with an analog voltage input terminal and a trigger signal input terminal, thereby outputting a plurality of control signals corresponding to a value of the analog voltage entered to the analog voltage input terminal; and resistance value changing means provided with a plurality of switches and a plurality of resistors and connected to a power supply via pull-up means grounded at its one end and connected to the analog voltage input terminal at the other end and provided with at least a pull-up resistor and enabled to change the resistance value between those two-ends with use of one of the plural switches. In addition, the wake-up circuit is also provided with wake-up trigger signal generating means between the resistance value changing means and the trigger signal input terminal, so that a wake-up trigger signal is output when the voltage of the resistance value changing means changes. This is why only one connection line is used both for the connection between the resistance value changing means and the analog voltage input terminal of the controller and for the connection between the resistance value changing means and the wake-up trigger signal generating means respectively. The configuration of the wake-up circuit of the present invention can thus be simplified with use of less parts and less connection lines. In addition, the configuration of the wake-up circuit is not decided by the number of switches in the resistance value changing means, the circuit is compatible with other circuits even when the number of switches differ among them. The manufacturing cost of the circuit can thus be reduced. And, the number of switches in the resistance value changing means can be increased easily.

What is claimed is:

1. A wake-up circuit, comprising:
    a controller provided with an analog voltage input terminal and a trigger signal input terminal to output a plurality of control signals corresponding to a value of an analog voltage entered to the analog voltage input terminal;
    a switch unit having a plurality of switches and a plurality of resistors, the switch unit having one end grounded and another end connected to the analog voltage input terminal; and
    a pull-up circuit having a pull-up resistor, the pull-up circuit connecting the switch unit with a power source such that the switch unit changes, by the switches, the resistance value between the one end of the switch unit and the other end of the switch unit; and
    a wake-up trigger signal generator provided between the switch unit and the trigger signal input terminal, the wake-up trigger signal generator outputs a trigger signal when a voltage of the switch unit changes, thereby waking up the controller,
    wherein the controller is provided with a first output terminal to output a high level signal in a sleep state and a low level signal upon receiving the trigger signal, and
    wherein the wake-up trigger signal generator comprises a first PNP transistor having an emitter connected to the first output terminal, a collector connected to the trigger signal input terminal, and a base connected to the other end of the switch unit respectively.

2. The wake-up circuit according to claim 1, wherein the wake-up trigger signal generator comprises a second PNP transistor having an emitter connected to a power supply that outputs a high level voltage and a collector is connected to the trigger signal input terminal; and
    wherein a differentiating circuit is provided between a base of the second PNP transistor and the other end of the switch unit respectively.

3. The wake-up circuit according to claim 1,
    wherein the pull-up circuit is provided with at least one switch connected serially to the pull-up resistor, and
    wherein the controller is provided with a second output terminal, whereby a signal output from the second output terminal turns off the at least one switch when the controller is in a sleep state and turns on the at least one switch when the controller is woken up.

4. The wake-up circuit according to claim 3, wherein the at least one switch comprises a transistor having a base connected to the second output terminal.

5. The wake-up circuit according to claim 2,
    wherein the pull-up circuit is provided with at least one switch connected serially to the pull-up resistor, and
    wherein the controller is provided with a second output terminal, whereby a signal output from the second output terminal turns off the at least one switch when the controller is in a sleep state and turns off the at least one switch when the controller is woken up.

6. The wake-up circuit according to claim 5, wherein the at least one switch comprises a transistor having a base connected to the second output terminal.

7. A wake-up circuit, comprising:
    a controller provided with an analog voltage input terminal and a trigger signal input terminal to output a plurality of control signals corresponding to a value of an analog voltage entered to the analog voltage input terminal;
    a switch unit having a plurality of switches and a plurality of resistors, the switch unit having one end grounded and another end connected to the analog voltage input terminal; and
    a pull-up circuit having a pull-up resistor, the pull-up circuit connecting the switch unit with a power source such that the switch unit changes, by the switches, the resistance value between the one end of the switch unit and the other end of the switch unit; and
    a wake-up trigger signal generator provided between the switch unit and the trigger signal input terminal, the wake-up trigger signal generator outputs a trigger signal when a voltage of the switch unit changes, thereby waking up the controller,
    wherein the pull-up circuit is provided with at least one switch connected serially to the pull-up resistor, and
    wherein the controller is provided with an output terminal, whereby a signal output from the output terminal turns off the at least one switch when the controller is in a sleep state and turns on the at least one switch when the controller is woken up.

8. The wake-up circuit according to claim 7, wherein the wake-up trigger signal generator comprises a PNP transistor having an emitter connected to a power supply that outputs a high level voltage and a collector is connected to the trigger signal input terminal; and wherein a differentiating circuit provided between a base of the PNP transistor and the other end of the switch unit respectively.

9. The wake-up circuit according to claim 7, wherein the at least one switch comprises a transistor having a base connected to the output terminal.

* * * * *